(12) United States Patent
Hack et al.

(10) Patent No.: US 7,376,579 B2
(45) Date of Patent: May 20, 2008

(54) BUSINESS PROCESS ANALYSIS TOOL

(75) Inventors: Stefan Hack, Wiesloch (DE); Shaun Elliott, Heidelberg (DE)

(73) Assignee: SAP AG, Walldorf (DE)

( * ) Notice: Subject to any disclaimer, the term of this patent is extended or adjusted under 35 U.S.C. 154(b) by 1154 days.

(21) Appl. No.: 10/161,446

(22) Filed: May 31, 2002

(65) Prior Publication Data

US 2003/0187707 A1 Oct. 2, 2003

Related U.S. Application Data

(60) Provisional application No. 60/369,020, filed on Mar. 29, 2002.

(51) Int. Cl.
*G06F 17/30* (2006.01)
*G06F 3/00* (2006.01)

(52) U.S. Cl. .................. 705/10; 708/134; 708/163; 706/925; 705/11

(58) Field of Classification Search ............... 705/10, 705/11; 708/134, 163; 706/925
See application file for complete search history.

(56) References Cited

U.S. PATENT DOCUMENTS

| | | | |
|---|---|---|---|
| 4,674,042 A | 6/1987 | Hernandez et al. | |
| 5,884,287 A | 3/1999 | Edesess | |
| 6,119,149 A | 9/2000 | Notani | |
| 6,151,707 A | 11/2000 | Hecksel et al. | |
| 6,256,676 B1 | 7/2001 | Taylor et al. | |
| 6,341,276 B1 * | 1/2002 | Bender et al. | 706/50 |
| 6,345,239 B1 | 2/2002 | Bowman-Amuah | |
| 2002/0099582 A1 * | 7/2002 | Buckley et al. | 705/7 |
| 2003/0069986 A1 * | 4/2003 | Petrone et al. | 709/232 |

OTHER PUBLICATIONS

MySAP.www.sap.com, archived using http://www.archive.org, latest date Jan. 24, 2001. p. 1-30.*
*ARIS Toolset*, IntelliCorp, Data sheet [on-line] from Collaborative Processes Integration website Retrieved from the Internet Mar. 6, 2003 at URL: http://cpi.co.za/products/toolset.html.
*ARIS Toolset*, IntelliCorp, Data sheet from IDS Scheer Inc. 1205 Westlakes Drive, Suite 270, Berwyn, PA 19312.
*Ascendant Methodology*, PriceWaterhouseCoopers, Marketing data release [on-line]. Retrieved from the Internet Mar. 9, 2003 at URL: http://www.pwcglobal.com/Extweb/service.nsf/docid/B5DF953737D8C8E180256A0D005B9FC1.
*Business Case Analysis*, Oracle Corp., Data sheet [on-line]. Retrieved from the Internet Mar. 9, 2003 at URL: http://www.oracle.com/consulting/offerings/strategy/sva_ds.html.
Thomas Hess/Leo Brecht, *State of the Art Des Buisness Process Redesign—Darstellung und Vergleich bestehender Methoden*, Gabler, 1995 (with English translation).
Scheer, *Business Process Engineering*, 2nd Edition, Springer-Verlag, 1994 (Table of contents only).
Sabatina Scelza, "Information Technology Support for Supply Chain Management," Dissertation, Johann Wolfgang Goethe University, Aug. 13, 1999 (with English translation).

* cited by examiner

*Primary Examiner*—Romain Jeanty
*Assistant Examiner*—Alison Karmelek
(74) *Attorney, Agent, or Firm*—Fish & Richardson P.C.

(57) ABSTRACT

A strategic management tool that derives relevant business processes. The tool provides a set of business processes based on information from at least one of a market force and an industry trend and applies a method to identify a subset of the business processes. The method is selected from at least one of transformational strategy method, a business goals and objectives method and a program solutions method.

33 Claims, 9 Drawing Sheets

BUSINESS PROCESS ANALYSIS TOOL

REFERENCE TO RELATED APPLICATION

This application claims priority from U.S. provisional patent application No. 60/369,020, filed on Mar. 29, 2002, entitled "Strategic Opportunity Management Tools and Electronic Business Casebuilder," which is incorporated herein by reference in its entirety.

TECHNICAL FIELD

This invention relates to a strategic opportunity management tool, and in particular, to a business process analysis tool.

BACKGROUND

An industry is typically comprised of business entities that interact with other business entities. The business entities may include market participants who may use software tools to make decisions regarding how best to interact with other business entities.

An industry may include any number of market participants in a value chain. For example, a consumer products industry may have participants including a component supplier, a manufacturer, a distributor, a retailer as well as others. An oil and gas value chain may include participants involved in activities such as exploration and production, refining and service station end consumer as well as others.

The market participants in an industry may interact with other market participants in the industry or participants from other industries. Each interaction may involve business processes that may vary in complexity depending on the relationship between the participants and factors affecting the industry. For example, a manufacturer in a consumer products industry may have a need for a business process to manage an inventory of components from a supplier to reduce the cost of manufacturing a product. The manufacturer in this example may choose to implement a business process such as supply chain management (SCM) or materials resource planning (MRP) to enhance inventory control.

A market participant may have a need for many business processes. The participant may be desire to select from many processes available a subset that is most relevant and value-adding to the participant's role. For example, retailer in a consumer products industry may determine that a process for enhancing end consumer goodwill is more relevant than a process for managing inventory. In contrast, a wholesale distributor in a oil and gas industry may decide that a process for managing inventory is more relevant than a process for enhancing end consumer goodwill.

SUMMARY OF THE DISCLOSURE

In one aspect, a method is disclosed for deriving relevant business processes. In one embodiment the method may include providing a set of business processes based on a user's selection of an industry and a market participant and identifying a subset of the business processes through a transformational strategy method, a business goals and objectives method and a program solutions method. The aforesaid method may include prompting the market participant to provide business information to identify the subset of business processes.

A second aspect is an article comprising a computer-readable medium storing computer-executable instructions that when applied to one or more computers causes the computers to perform the method disclosed above.

In a third aspect, a system is provided that includes one or more computers configured to perform the method disclosed above.

In various implementations, the above techniques may provide one or more of the following advantages. A subset of the business processes particularly relevant to a market participant may be derived using a wide range of methods which may be used by different types of users. For example, a user such as a high level executive may have little time to perform a thorough analysis, so the transformational strategy method may be appropriate because it requires little input from the user. On the other hand, a program solution method may provide the most detailed analysis which may be more appropriate to the functional manager because it provides a tactical focus. The business goals and objectives method may be more appropriate for a middle manager because it provides for input of broad business strategies. Moreover, by identifying a subset of the business processes that are most relevant to the business needs of the market participant, the decision making process of the market participant may be improved.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
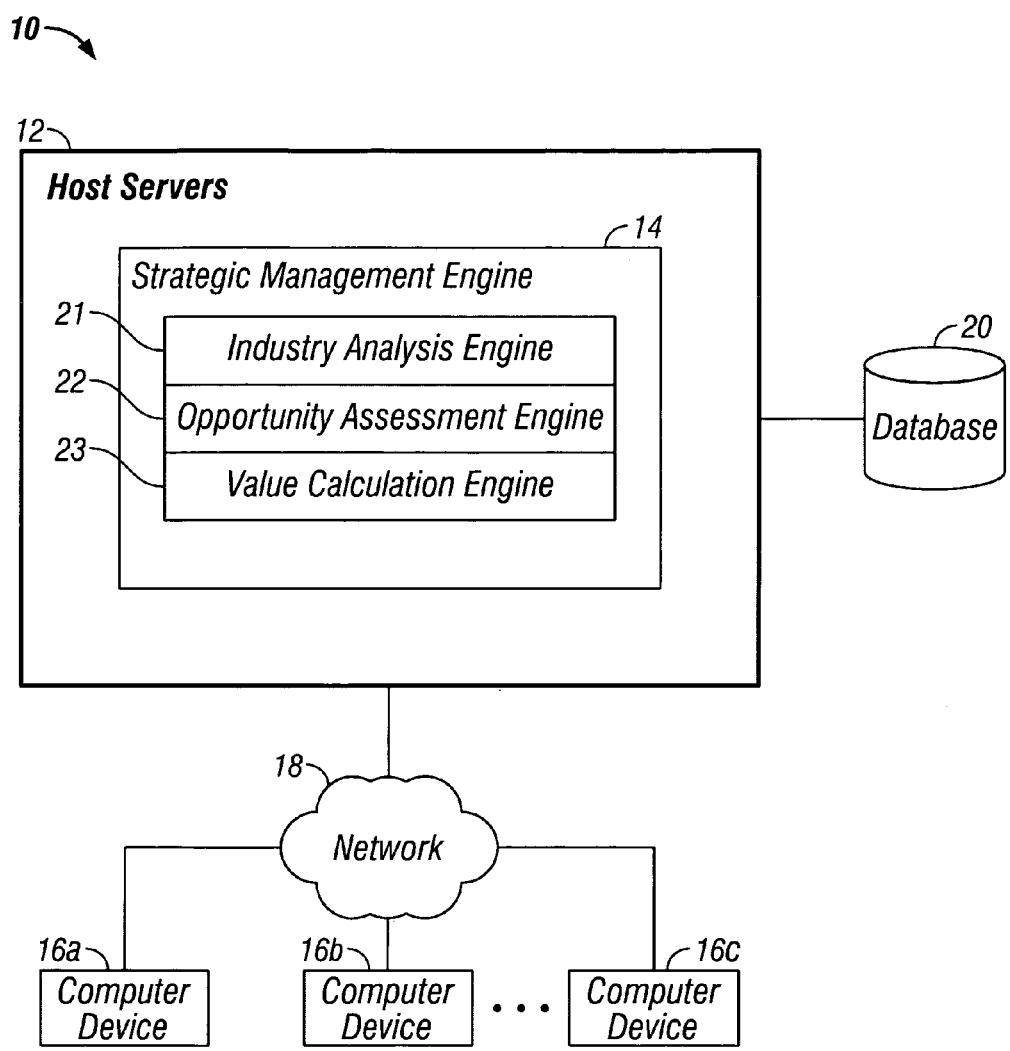
FIG. 1A is block diagram of a strategic opportunity management system according to one implementation.

FIG. 1A is a block diagram of a strategic opportunity management system 10. The system 10 includes one or more host servers 12 that includes a strategic management engine 14 that may be accessed by user using computer devices 16a, 16b, . . . 16n over a network 18. The strategic management engine 14 includes an industry analysis engine 21, an opportunity assessment engine 22, and a value calculation engine 23. In certain embodiments, the system 10 provides information to assist a user in analyzing a strategic opportunity. Such information may include, for example, industry data relevant to a customer, a list of business scenarios relevant to the user, proposed business strategies and objectives, proposed products and services that meet the business strategies and objectives, and a high level calculation of the value (e.g., return on investment) that may be provided by implementation of the products and services that meet the identified business strategies and objectives.

The host servers 12 of FIG. 1A may include, for example, an Internet-accessible server. The strategic management engine 14 may be distributed and executed on one or more host servers 12. A database 20 may be used by the host servers 12 to store and retrieve information related to the operation of the host servers 12 including the execution of the strategic management engine 14. The network 18 may include a plurality of devices such as servers, routers and switching circuits connected in an intranet, extranet or Internet configuration.

A user may use a computer device, such as computer device 16a, to access the host servers 12 over a network 18. The computer device 16a may include a personal computer (PC), personal digital assistant (PDA) or other device using wireless or wired communication protocols to access the host servers 12. The computer device 16a may be coupled to I/O devices (not shown) that may include a keyboard in combination with a pointing device such as a mouse to input data into the computer, a computer display screen and/or a printer to produce output from the computer, a storage resource such as a hard disk drive for storing and retrieving data for the computer, and/or other I/O devices.

Figure 1B:
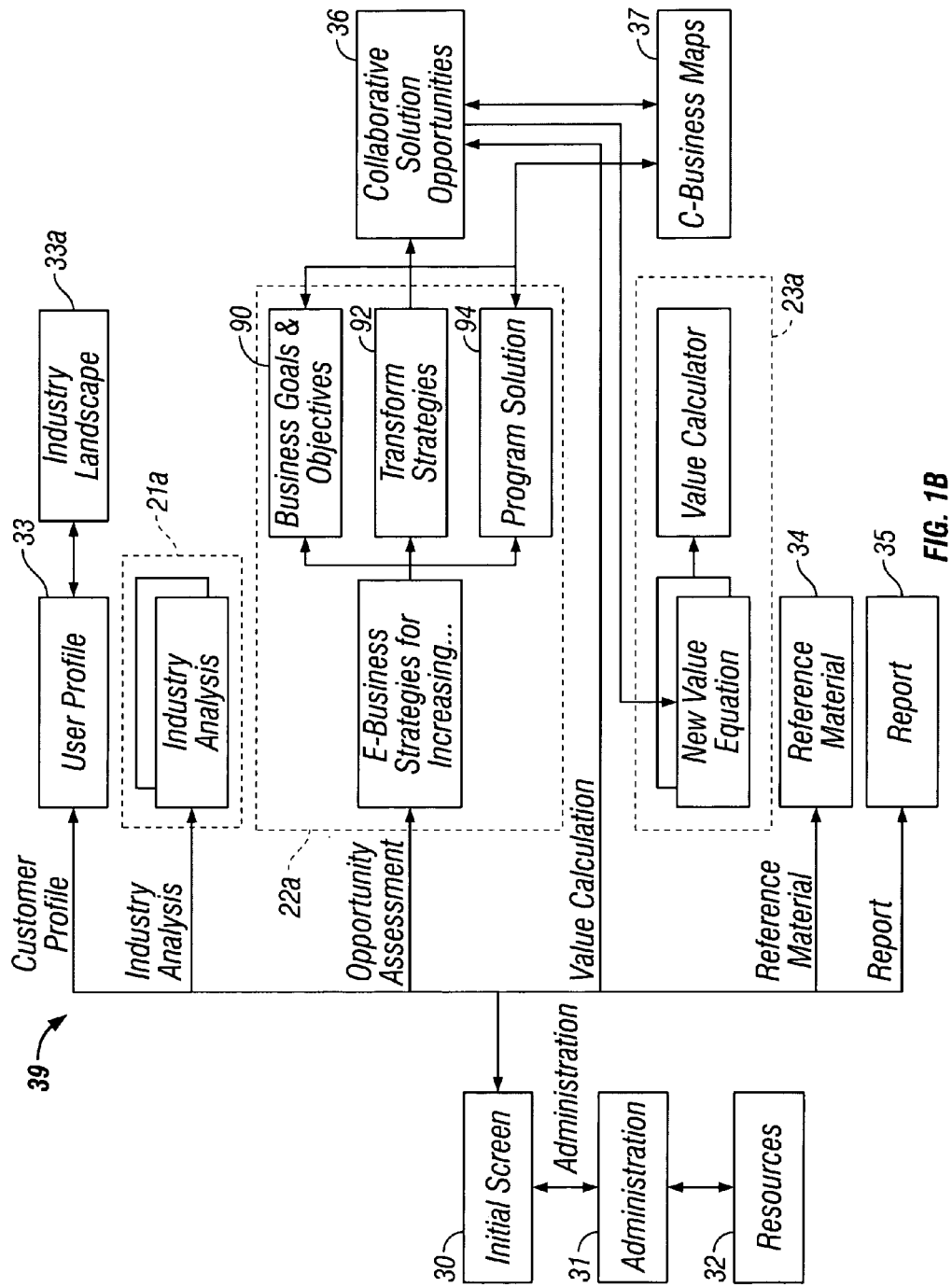
FIG. 1B is process diagram of a strategic opportunity management tool according to one implementation.

FIG. 1B is a process diagram of an implementation of a strategic opportunity management system 10. Processes 39 may be implemented using a graphical user interface. The processes 39 may include an "initial" display 30 of information related to the system 10 such as a description of the purpose and the output of the system. A "user profile" 33 may allow the user to enter information related to the industry that is of interest to the user. This information may be used to identify an industry from an industry landscape that may include a plurality of industries. For example, a user in the consumer products industry may desire to select information related to that industry from among a plurality of industries. "Administration" 31 may be provided to manage a user's profile including providing a "create" area that allows the user to create a new user profile and a "view/edit" area that allows the user to view or edit a previously created user profile. User profile information includes information provided by the user which may be used during the operation of the strategic management engine 14. However, to gain access to the system 10, the "administration" 31 may require the user to provide uniquely identifiable information such as a company name and/or a profile identifier. The identifiable information provided by the user may be compared with user information previously stored in the host servers 12 to determine whether the user currently attempting to access the system 10 is authorized to access the system. "Resources" 32 may provide links and Email addresses for business case resources such as business case systems, competitive information, business case development and consulting, sales support, evaluation and design tools, public information, or other resources.

If the user is authorized to access the system 10, the user may select the "industry analysis" 21a function from the processes 39. This engine, in certain embodiments, may help the user identify an industry sector from a predetermined industry landscape that includes a plurality of industry sectors. Examples of industry sectors include consumer products, utilities, chemicals, oil and gas, and the like. The "industry analysis" 21a also may provide or conduct, in selected implementations, an industry analysis. The industry analysis may include defining participants in terms of their function or role. For example, in the consumer products sector, the participants may include a manufacturer, supplier, retailer, intermediate manufacturer, distributor, and the like.

The industry analysis may also identify market forces associated with the selected industry sector for each role. In an illustrative embodiment, trends related to a manufacturer may include tight labor markets, shift toward a retail demand focus, and rapidly shifting consumer preferences. Details concerning certain of the identified market factors may also be displayed. The system may optionally also display solutions/responses to certain of the identified market factors (e.g., one-to-one customer interaction in response to tight labor market). The system may also identify industry trends being pursued by other firms in the selected industry sector (s). The industry analysis may also provide case examples. The information and/or analysis may be derived from databases and other such sources.

An "opportunity assessment" 22a function, in certain embodiments, may assess and generate data concerning one or more opportunities, or may provide proposed business strategies suitable for the selected industry sector. For example, a manufacturer in an consumer products industry may be able to analyze data related to changes in consumer demand. A user may select role or participant functionality. For instance, in the consumer products industry sector, the participants may include a manufacturer, distributor, retailer, and the like. The system may also be configured to permit the user to select a business maturity for various facets of the participant entity, such as strategy, infrastructure, technology, and business culture. "Business maturity" is that period during which an enterprise seeks to secure market position, optimize investment opportunities, and explore product and market diversification. The "opportunity assessment" 22a section may allow identification of value-added business processes and/or strategies. For example, some versions may feature three ways to identify business strategies. The first presents transformation strategies 92. The second identifies proposed business goals and strategies 90. The third presents various solution areas that logically group various strategies 94.

In the first method 92 of identifying value-added strategies, transformation strategies are defined and presented along with proposed complementary strategies that will produce a shortlist of relevant and value-adding business strategies for the user. The user may select for further analysis one or more strategies from a list of strategies recommended by the system. For example, a user, such as a manufacturer in a consumer products industry, may select for further analysis the transformational strategy "customer self-service." In response, the system may provide and/or describe "complementary business strategies" such as "one-to-one customer interaction" or customer life-cycle management. By reviewing the transformational strategies, the customer may identify which method or methods are most appropriate for their business.

In the second method 90, business objectives are presented with a list of possible specific plans to accomplish those objectives A user may select one or more of the plans for further analysis. For example, a user, such as a manufacturer in a consumer products industry, may select a Business Goal such as "reducing operating costs" or "lowering working capital." For each goal, the system may provide one or more business objectives such as "reduce inventory levels" or "improve procurement processes" to achieve the selected goal. This method of producing a shortlist of relevant and value-adding business processes may require more detailed user input than the transformational strategies method, and may be more suitable for a business unit operational head.

The third method 94 of identifying value-added business strategies presents various solution areas that logically group various strategies. A user may select a group of strategies based on problem statements or questions associated with a strategy group. For example, a "customer relationship management" group of strategies may offer the problem statement "Are your high-value customers getting the service they deserve?" The system may display a list of business scenarios (e.g., collaborative sales processes, key account management). After reviewing the aforementioned information, the user may rank the relative importance of each business scenario. The rankings of the importance of the business scenarios may help to define a set of strategies. This method may be more targeted than the other two methods, and may be more suitable for the tactical business processes appropriate for functional managers.

Figure 4A:
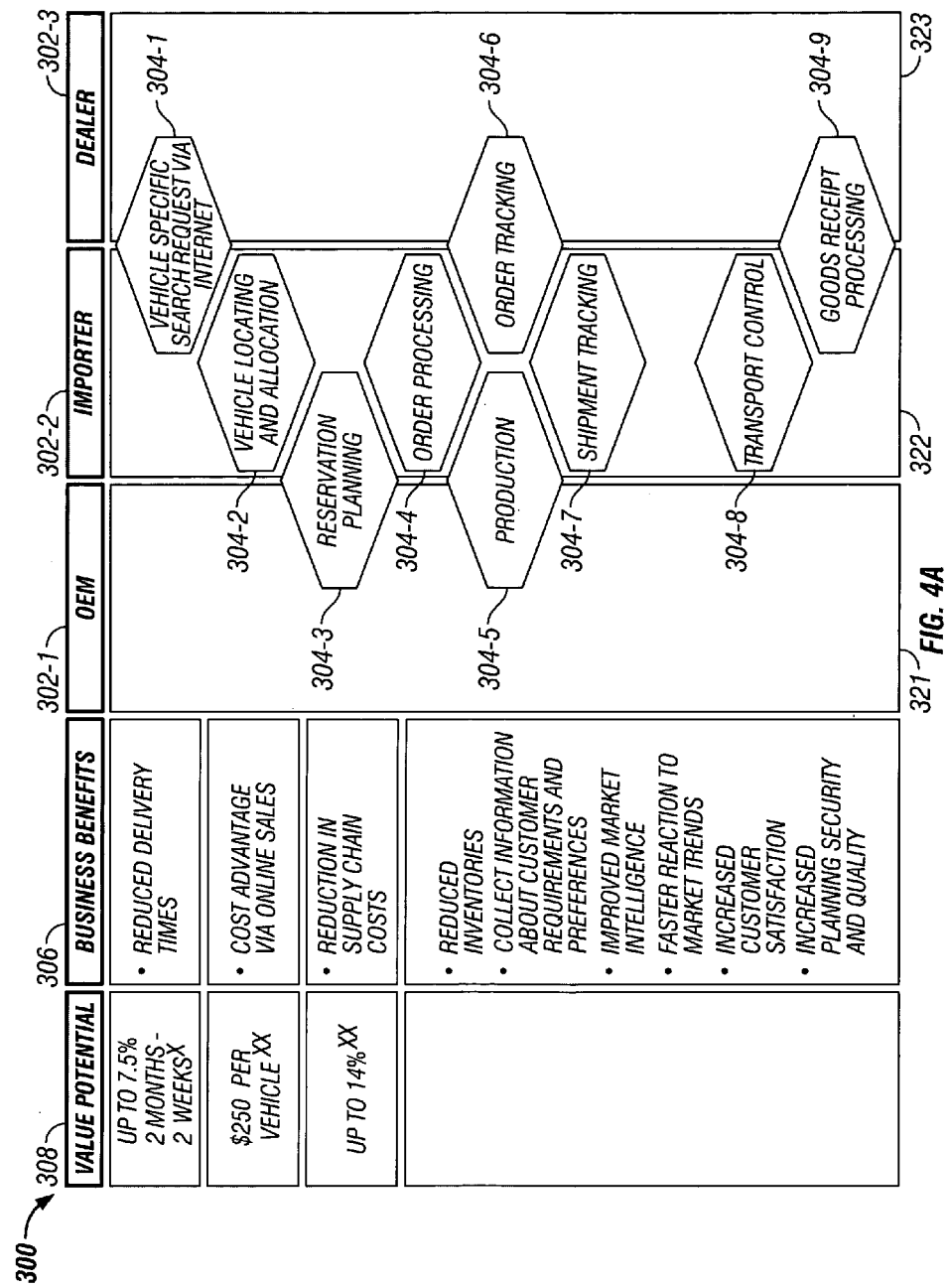
FIG. 4 depicts a CBS business view.
Figure 4B:

The relevant and value-adding business scenarios obtained above maybe used in conjunction with the collaborative solution opportunities 36 to generate C-Business Maps 37. FIG. 4 depicts an exemplary business view 300 which is a graphical depiction of interlocking polygons, enabling the integration of common business purposes and the ability to anticipate business benefits while implementing a collaborative business scenario (CBS).

Business view 300 illustrates a exemplary collaboration between various participants involved (for example, original equipment manufacturer, importer and dealer), types of CBS present, collaborative business aspects between the participants, scope of the business collaboration, impact on the business and the value chain, anticipated business benefits and quantifiable value potential. Business view 300 may be linked to an interaction view described below in FIG. 5. The system landscape depicts the different activities of a CBS implemented in many information technology systems. See, for example, U.S. provisional patent application No. 60/369,020, filed on Mar. 29, 2002, entitled "Strategic Opportunity Management Tools and Electronic Business Casebuilder."

Figure 5:
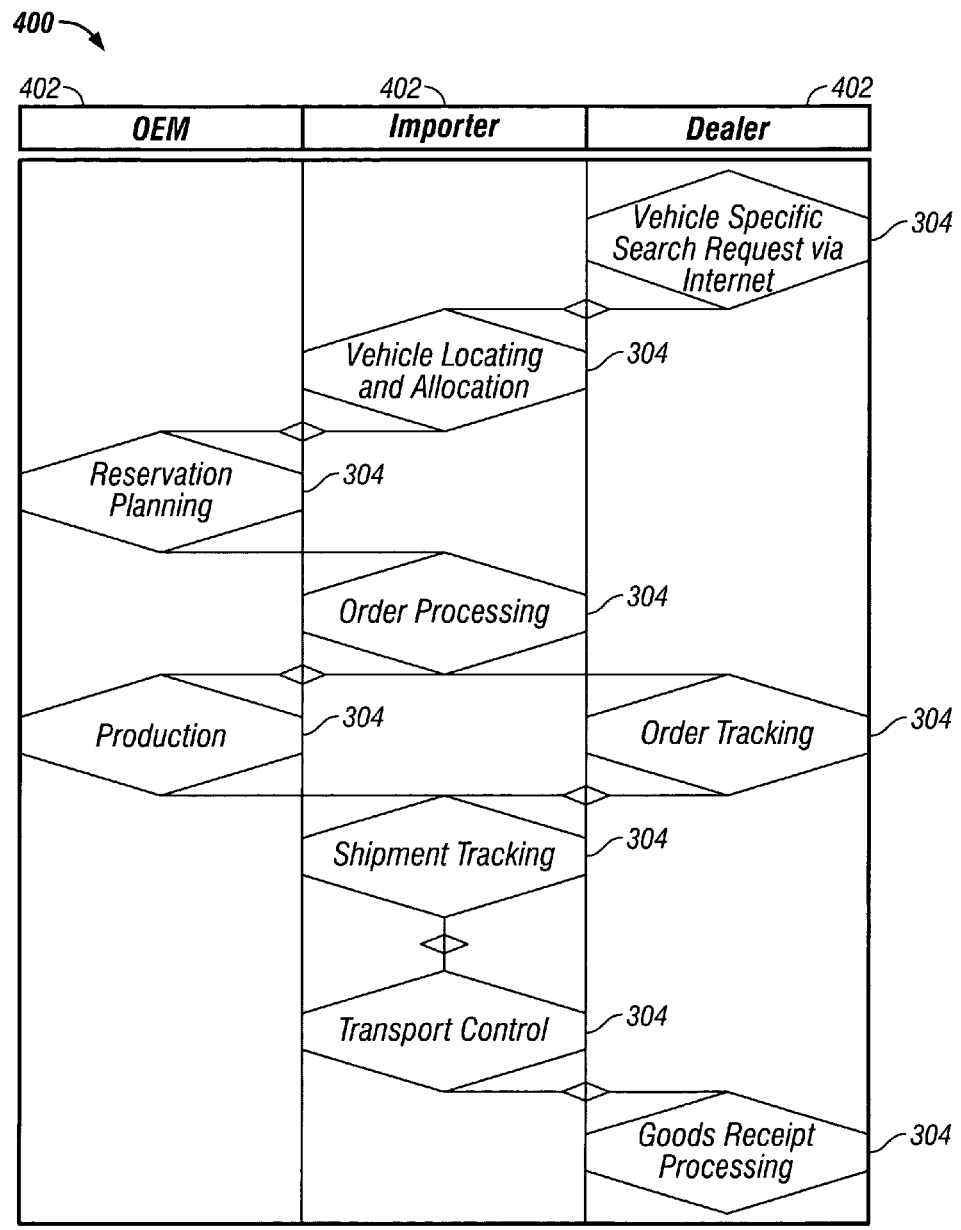
FIG. 5 depicts CBS interactive view.

FIG. 5 depicts an exemplary component view which may offer a further drill-down view of the CBS and its implementation in installed system landscape. The system landscape depicts the different activities of a CBS implemented in many information technology systems. See, for example, U.S. provisional patent application No. 60/369,020, filed on Mar. 29, 2002, entitled "Strategic Opportunity Management Tools and Electronic Business Casebuilder."

Figure 6:
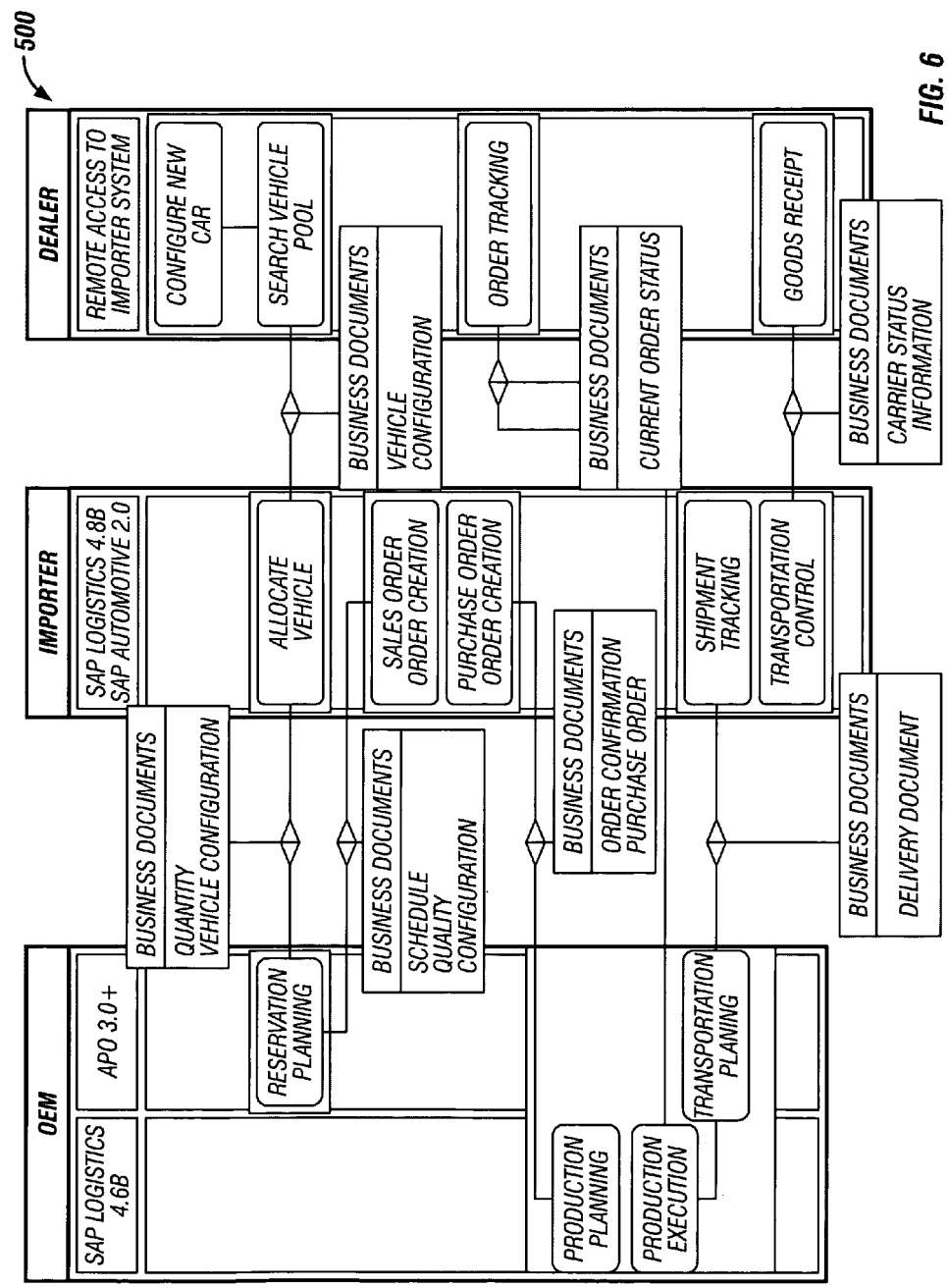
FIG. 6 depicts a CBS component view.

FIG. 6 depicts an exemplary component view which may offer a further drill-down view of the CBS and its implementation in installed system landscapes. See, for example, U.S. provisional patent application No. 60/369,020, filed on Mar. 29, 2002, entitled "Strategic Opportunity Management Tools and Electronic Business Casebuilder."

The results of "opportunity assessment" 22a may be provided to "collaborative solution opportunities" 36 function and "C-business maps" (Collaborative Business Maps) 37 function. The "C-business maps" 37 function refers to a method of viewing and modeling business scenarios using program solutions. It provides a visual representation of business processes and typical employee roles and presents the benefits and potential value that may be achieved by using these solutions. The "collaborative solution opportunities" 36 function may identify information technology (IT) tasks required to implement the solutions and determine an array of potential implementations to facilitate those tasks. See, for example, U.S. provisional patent application No. 60/369,020, filed on Mar. 29, 2002, entitled "Strategic Opportunity Management Tools and Electronic Business Casebuilder."

A "value calculation" 23a function may calculate the value of the strategies selected by the user (such selection may occur in the foregoing steps in certain embodiments). The system may identify software products and related services that may be used to implement or facilitate the strategies identified in the previous steps. The value calculation may be based on customer-provided input regarding potential value or savings. For instance, the user may input cost advantages (e.g., potential procurement cost reduction), revenue growth opportunities (e.g., improved order fill rate), and intangible benefits (e.g., goodwill). The system then generates a report that may identify business concerns such as return on investment, payback period, and/or net present value associated with the proposed solution(s).

"Reference material" 34 may be used to maintain links to reference material that might be of interest to a particular user. For example, the material may include presentations, spreadsheets, information regarding Websites, or other material. An output report for the user that may include information from the above functions or screens may be generated at "report" 35. The format of the report may be a soft copy, such as a printed version, a hard copy such as an electronic file in the host server 12, or other format that may be in machine or human readable format.

Figure 2:
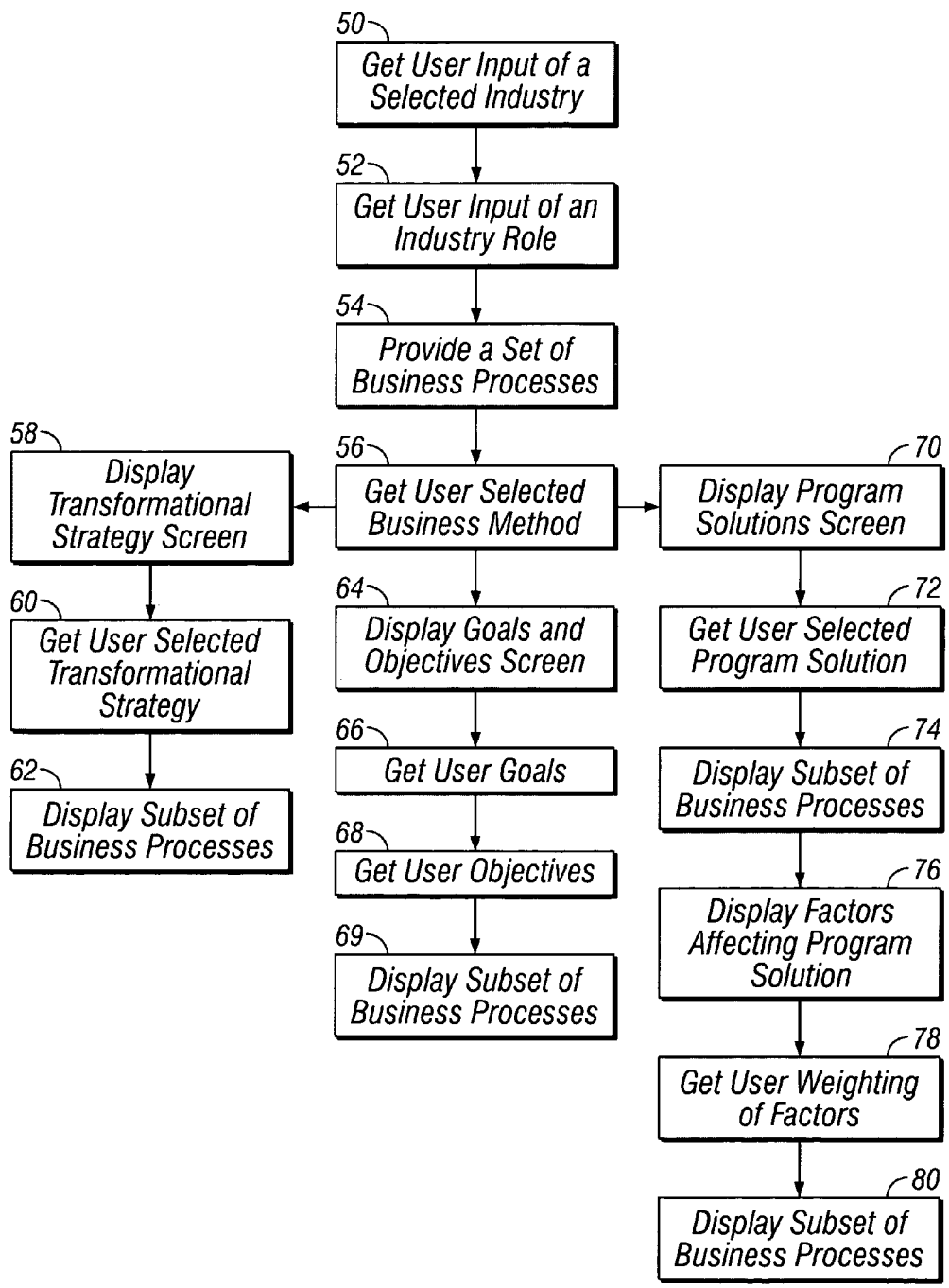
FIG. 2 is a flowchart showing the operation of various aspects of the strategic opportunity management tool according to one implementation.

FIG. 2 is a flowchart showing the operation of the opportunity assessment process 22a portion of the strategic management system 10. This aspect of the system 10 allows a user, such as a market participant, to derive relevant business processes associated with an industry selected by the market participant. In one embodiment, the system 10 receives 50 from a user an industry that is of interest to the user for analysis. The system also receives 52 from the user a selected role within the selected industry.

Figure 3A:
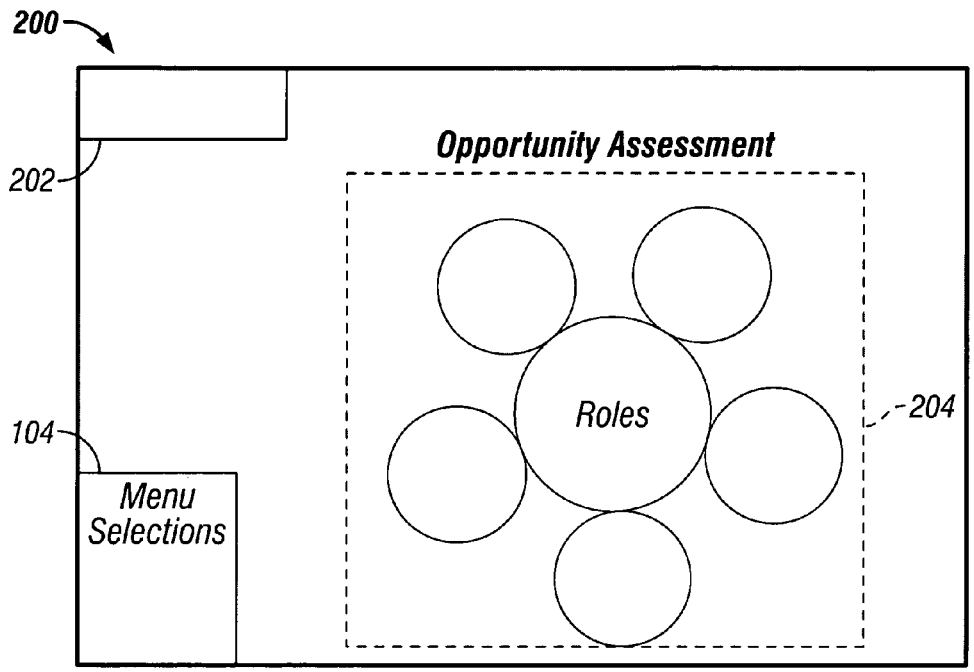
FIGS. 3A-3D depict output from a strategic opportunity management tool according to one implementation.

In response, the system provides 54 a set of business processes based on the information provided by the user. In one embodiment, the opportunity assessment process 22a displays an "opportunity assessment" screen 200 corresponding to an industry selected by the user. (See FIG. 3A) A "heading" 202 indicates the industry that has been selected. The user may select the type of market participant that is of interest to the user from a "market participant" area 204. The market participant that the user selects may be used throughout the opportunity assessment function. Alternatively, the user may select another market participant for additional analysis.

After the user has made a "market participant" selection from area 204 on the "opportunity assessment" screen 200, the system may apply a user preferred method to identify a subset of the business processes. The system gets 56 from the user a selected method from at least one of transformational strategy method, business goals and objectives method and program solutions method. Information is gathered regarding the business which may be provided by the user. Such information may include the type of industry, the type of market participant within the industry selected by the user, external information such as market forces and industry trends, or other information. For example, a market participant, such as a distributor in a consumer products industry, may identify a business need to receive orders for products stored in a warehouse and to distribute the products to retail stores.

For example, the system 10 displays 58 a "transformational strategies" screen 210 which represents the first of three methods used to produce a set of relevant and value-added business processes for the business need associated with the market participant. (See FIG. 3B) As is described below in further detail, the second method, which is referred to as the "business goals and objectives" method, may be chosen by selecting tab 218b. Likewise, the third method, which is referred to as the "program solution" method, may be selected by clicking tab 218c.

The screen 210 provides a "business process" area 212 which displays one or more "business process" icons representing business processes related to the market participant. A "header" area 216 may indicate the type of market participant and the industry that is being analyzed. A "description" area 214 may provide information regarding a business process that is highlighted in the "business process" area 212. Such information may include a definition of the business process, benefits of using the business process, complementary strategies and initiatives, or other information.

Figure 3B:
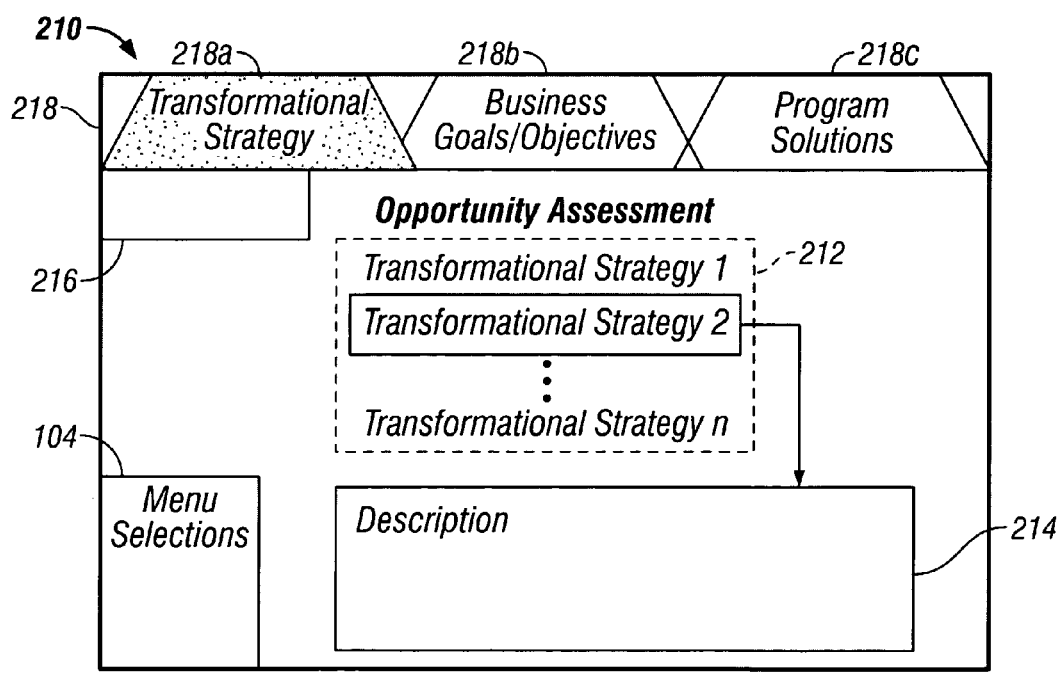

Referring to FIG. 2, the system 10 gets 60 from the user a selected transformational strategies (See, for example, 212 in FIG. 3B). For example, a manufacturer in the consumer products industry may use transformational strategies to identify "customer self-service" and "customer life cycle management" as the relevant business processes for this market participant. As a result, the system may allow a high-level executive having little time or insufficient detail regarding the industry to make a decision based on the relevant business processes associated with the industry. In response, the system 10 displays 62 a relevant and value adding subset of the business process. (See, for example, 214 in FIG. 3B)

Figure 3C:
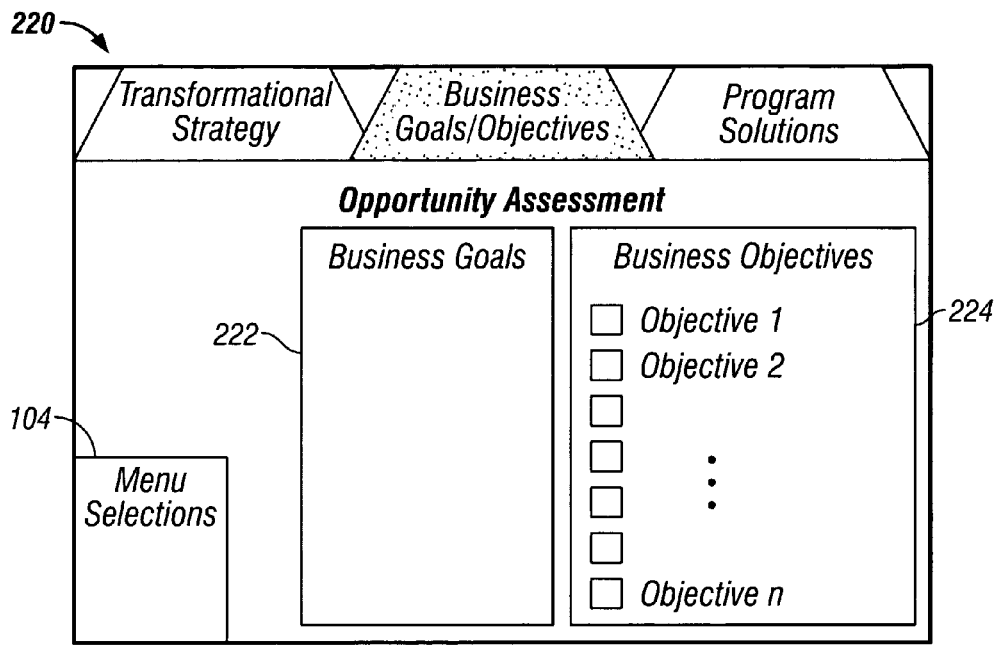

Once the user has reviewed the relevant business processes displayed on the "transformational strategies" screen 210, the user may select 56 another method to analyze the industry such as, for example, the "business goals and objectives" method. This method represents the second of the three methods used to produce a short-list of relevant and value-added business processes for the user. The user selects the "business goals and objectives" tab 218c which may cause the system to display 64 the "business goals and objectives" screen 220. (See FIG. 3C). The "business goals and objectives" screen 220 includes a "goal" area 222 that may be used to list business goals and an "objective" area 224 that may be used to list business objectives corresponding to the listed goals. The user may evaluate a "goal" by selecting a relevant goal and then selecting a relevant "objective" for each selected "goal".

Referring to FIG. 2, the system gets 66 from the user a selected business goal. (See, for example, 222 in FIG. 3C) Based on the user selected business goal, the system 10 displays associated business objectives (See, for example, 224 in FIG. 3C). The system gets 68 gets from the user selected business objectives and displays 69 the subset of relevant and value adding business processes. This method may require more detail than the "transformational strategies" method described above, so it may be more suitable for business unit managers. The information displayed on the "business goals and objectives" screen 220 may be based on publicly available information from external sources such as websites, mission statements, annual reports, or other sources.

Figure 3D:
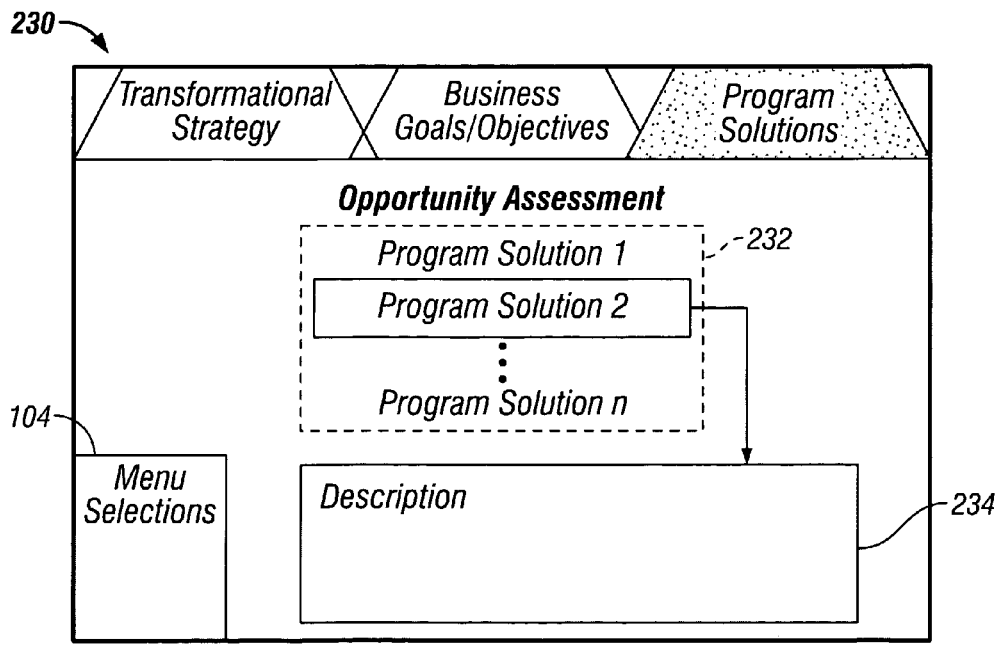

Once the user has evaluated the information on the "business goals and objectives" screen 220, the user may select 56 another method such as the "program solution" method. This method is the third of the three methods used to produce a shortlist of relevant and value-added business processes for the user. The user selects the "program solution" tab 218c which may cause the system to display 70 the "program solution" screen 230. (See FIG. 3D) The "program solution" screen 230 includes "solution" areas 232 which includes a "business issue" list representing business issues that customers may encounter in the industry. The business issues may be addressed by a proposed programs represented by a "solution program" area. In this example, the market participant may be a manufacturer in the consumer products industry. The solution area 232 may present the manufacturer with a business issues in this industry, such as whether there "is a lack of control over price negotiation/bidding with a supplier." The "solution program" may suggest an program as a possible solution to the business issue presented in the "business issue" list. This "program solution" method may present greater detail to the user when compared to the "transformational strategies" or the "goals and objectives" methods described above, so it may be more suitable for functional managers. The information displayed on the "program solution" screen 220 may be based on publicly available information from external sources such as websites, mission statements, annual reports, or other sources.

Referring to FIG. 2, the system gets 72 from the user a program solution. (See, for example, 232 in FIG. 3D) Based on the user selected program solution, the system 10 displays 74 a subset of a subset of relevant and value adding business processes (See, for example, 234 in FIG. 3D).

The system may display 76 additional information regarding the solution areas 232 by allowing the user to click on a particular solution area. For example, as shown in FIG. 3E, a "customer relationship management" screen 240 may be displayed as a result of the user clicking on a "customer relationship management" solution area 232 in FIG. 3D. The "customer relationship management" screen 240 displays a list of relevant business scenarios 242 based on information from the user. Such information may include the industry selection, the market participant selection, the solution area selection, or other information. A description area 244 may be used to provide a high-level description of a particular business scenario that has been selected in the business scenario area 242.

Once the user has reviewed the description area 244 corresponding to the business scenario 242, the user may select 78 and rate or weight of each business scenario based factors such as the user's interest in the particular business scenario. A rating area 246 allows a user to rate the importance (low, medium, high) of the business scenarios. The user may return to other solution areas 232 displayed in the previous screen shown in FIG. 3D and rate the other solution areas. As a result, the system displays 80 a subset of business relevant and value-adding business processes (See, for example, 244 in FIG. 3E)

Those skilled in the art will appreciate from the foregoing description that the methods and apparatus identified herein may be advantageously modified in an almost limitless number of ways. For instance, one or more of the foregoing techniques may be advantageously performed in isolation or in any desired combination or order. The software may be configured to be executed on any variety of platforms, such as intranets, wireless networks, and local hard disks by way of non-limiting example. The software may be executed on one or more computers, host servers or distributed host servers. The systems and techniques described herein may be implemented in environments without software, including as "paper and pencil" versions. Any amount of propriety content may be incorporated into this system, such as propriety business models, industry trends, and market forces. Any aspect of the business strategy evaluation, value calculations, etc. may be implemented at a finer granularity by use of more detailed information, models, inputs and/or algorithms, for example. None of the particular techniques need be performed in the order indicated unless specifically stated. To the contrary, the techniques may be freely modified by substituting and/or reordering steps as suitable for particular implementations. Any output from the system described herein may be presented in any manner suitable for a particular user, and may include any aspect of the business strategies, industry trends, and market forces described herein.

Various features of the system may be implemented in hardware, software, or a combination of hardware and software. For example, some aspects of the system may be implemented in computer programs executing on programmable computers. Each program may be implemented in a high level procedural or object-oriented programming language to communicate with a host servers.

Furthermore, each such computer program may be stored on a storage medium, such as read-only-memory (ROM), readable by a general or special purpose programmable computer, for configuring and operating the computer when the storage medium is read by the computer to perform the functions described above.

Other implementations are within the scope of the following claims.

What is claimed is:

1. A method of deriving relevant business processes comprising:
   providing a set of business processes based on a user-selected industry and market participant;
   presenting at least three filter options to a user for filtering the set of business processes, the three filter options including: (i) a business goal and objective filter option that prompts the user to select a business goal from a list of business goals and to thereafter select a business objective from a list of business objectives offered to achieve the user-selected business goal; (ii) a transformational strategy filter option that prompts the user to select a transformational strategy from a list of transformational strategies wherein the business goal and objective filter option is configured to prompt the user for more input than the transformational strategy filter option; and (iii) a program solution filter option that prompts a user to select a program solution from a list of program solutions offered to address a business issue in the user-selected industry, wherein the program solution filter option is configured to provide more targeted information than the business goal and objective filter option and the transformational strategy filter option;
   in response to the user's selection of one of the three filter options, filtering the set of business processes to identify, a subset of the business processes, wherein the identified subset of business processes is relevant to the user's selection of the industry, the user's selection of the market participant, and the user's selection of one of the three filter options; and
   outputting the identified subset of business processes to the user.

2. The method of claim 1 further comprising retrieving the set of business processes from a database.

3. The method of claim 1 wherein the user's selection of the business goal and objective filter option includes selecting a business goal, the method further comprising providing the list of business objectives for achieving the selected business goal in response to the user's selection of the business goal.

4. The method of claim 3 wherein the user's selection of the business goal and objective filter option includes selecting a business objective from the list of business objectives.

5. The method of claim 1 wherein the user's selection of the transformational strategy filter option includes selecting a transformational strategy.

6. The method of claim 1 wherein the user's selection of program solution filter option includes selecting one or more factors affecting a program solution.

7. The method of claim 3 wherein the list of business goals includes at least one of increase revenue, reduce operating costs, improve customer service, lower working capital and manage fixed assets.

8. The method of claim 7 wherein the list of business objectives includes at least one of reduce administration, reduce inventory levels, reduce order processing costs, improve procurement processes, reduce transaction costs, reduce product returns, lower communications expenses, improve asset and maintenance management, improve vendor visibility, improve recruiting and hiring processes, improve delivery of training and education and reduce travel related expense.

9. The method of claim 5 wherein the list of transformational strategies includes at least one of customer self-service, one-to-one customer interaction, employee self-service, supplier and partner self-service, community empowerment and innovation and collaborative design.

10. The method of claim 6 wherein the user-selected program solution includes at least one of collaborative promotion planning, customer relations management, key account management, collaborative sales process and collaborative internet customer self-service.

11. The method of claim 1 further comprising generating a map that associates and identifies the market participants and relevant business processes.

12. The method of claim 1 wherein outputting the identified subset of business processes includes at least one of displaying the identified subset of business processes to the user and generating a printed report for the user.

13. The method of claim 1 further comprising activating an industry analysis engine to assist the user in selecting the industry from an industry landscape, the user's selection of the industry being used to provide the set of business processes.

14. The method of claim 13 wherein the industry analysis engine prompts the user to select an industry from a predetermined industry landscape, the selectable industries including at least one of consumer products, oil and gas, utilities, and chemical products.

15. The method of claim 1 further comprising generating a collaborative business map based upon the user's selection of the industry, the user's selection of the market participant, and the identified subset of business processes, the collaborative business map including activities performed by a first business entity and activities performed by a second business entity that collaborates with the first business entity.

16. An article comprising a computer-readable medium storing computer-executable instructions that when applied to one or more computers cause the computers to:
   provide a set of business processes based on a user-selected industry and market participant;
   present at least three filter options to a user for filtering the set of business processes, the three filter options including: (i) a business goal and objective filter option that prompts the user to select a business goal from a list of business goals and to thereafter select a business objective from a list of business objectives offered to achieve the user-selected business goal; (ii) a transformational strategy filter option that prompts the user to select a transformational strategy from a list of transformational strategies wherein, the business goal and objective filter option is configured to prompt the user for more input than the transformational strategy filter option; and (iii) a program solution filter option that prompts a user to select a program solution from a list of program solutions offered to address a business issue in the user-selected industry wherein, the program solution filter option is configured to provide more targeted information than the business goal and objective filter option and the transformational strategy filter option;

in response to the user's selection of one of the three filter options, filter the set of business processes to identify a subset of the business processes, wherein the identified subset of business processes is relevant to the user's selection of the industry, the user's selection of the market participant, and the user's selection of one of the three filter options; and output the identified subset of business processes to the user.

17. The article of claim 16 further comprising storing computer-executable instructions that when applied to one or more computers cause the computers to retrieve the set of business processes from a database.

18. The article of claim 16 further comprising storing computer-executable instructions that when applied to one or more computers cause the computers to generate a map that associates and identifies the market participants and relevant business processes.

19. The article of claim 16 wherein further comprising storing computer-executable instructions that when applied to one or more computers cause the computers to activate an industry analysis engine to assist the user in selecting the industry from an industry landscape, the user's selection of the industry being used to provide the set of business processes.

20. The article of claim 16 wherein further comprising storing computer-executable instructions that when applied to one or more computers cause the computers to generate a collaborative business map based upon the user's selection of the industry, the user's selection of the market participant, and the identified subset of business processes, the collaborative business map including activities performed by a first business entity and activities performed by a second business entity that collaborates with the first business entity.

21. A system for deriving a relevant business process, the system comprising one or more computers having a processor and memory configured to:

provide a set of business processes based on a user-selected industry and market participant;

present at least three filter options to a user for filtering the set of business processes, the three filter options including: (i) a business goal and objective filter option that prompts the user to select a business goal from a list of business goals and to thereafter select a business objective from a list of business objectives offered to achieve the user-selected business goal; (ii) a transformational strategy filter option that prompts the user to select a transformational strategy from a list of transformational strategies wherein, the business goal and objective filter option is configured to prompt the user for more input than the transformational strategy filter option; and (iii) a program solution filter option that prompts a user to select a program solution from a list of program solutions offered to address a business issue in the user-selected industry wherein, the program solution filter option is configured to provide more targeted information than the business goals and objective filter option and the transformational strategy filter option;

in response to the user's selection of one of the three filter options, filter the set of business processes to identify a subset of the business processes, wherein the identified subset of business processes is relevant to the user's selection of the industry, the user's selection of the market participant, and the user's selection of one of the three filter options; and output the identified subset of business processes to the user.

22. The system of claim 21 further comprising one or more computers configured to retrieve the set of business processes from a database.

23. The system of claim 21 wherein the user's selection of the business goal and objective filter option includes selecting a business goal, the system further comprising one or more computers configured to provide the list of business objectives for achieving the selected business goal in response to the user's selection of the business goal.

24. The system of claim 23 wherein the user's selection of the business goal and objective filter option includes selecting a business objective from the list of business objectives.

25. The system of claim 21 wherein the user's selection of the transformational strategy filter option includes selecting a transformational strategy.

26. The system of claim 21 wherein the user's selection of program solution filter option includes selecting one or more factors affecting a program solution.

27. The system of claim 23 wherein the list of business goals includes at least one of increase revenue, reduce operating costs, improve customer service, lower working capital and manage fixed assets.

28. The system of claim 27 wherein the list of business objectives includes at least one of reduce administration, reduce inventory levels, reduce order processing costs, improve procurement processes, reduce transaction costs, reduce product returns, lower communications expenses, improve asset and maintenance management, improve vendor visibility, improve recruiting and hiring processes, improve delivery of training and education and reduce travel related expense.

29. The system of claim 25 wherein the list of transformational strategies includes at least one of customer self-service, one-to-one customer interaction, employee self-service, supplier and partner self-service, community empowerment and innovation and collaborative design.

30. The system of claim 26 wherein the user-selected program solution includes at least one of collaborative promotion planning, customer relations management, key account management, collaborative sales process and collaborative internet customer self-service.

31. The system of claim 21 further comprising one or more computers configured to generate a map that associates and identifies the market participants and relevant business processes.

32. The system of claim 21 further comprising one or more computers configured to activate an industry analysis engine to assist the user in selecting the industry from an industry landscape, the user's selection of the industry being used to provide the set of business processes.

33. The system of claim 21 further comprising one or more computers configured to generate a collaborative business map based upon the user's selection of the industry, the user's selection of the market participant, and the identified subset of business processes, the collaborative business map including activities performed by a first business entity and activities performed by a second business entity that collaborates with the first business entity.

* * * * *